US006700727B1

(12) United States Patent
Crane et al.

(10) Patent No.: US 6,700,727 B1
(45) Date of Patent: Mar. 2, 2004

(54) SLIDER AND METHOD FOR ACTIVELY CONTROLLING CROWN CURVATURE

(75) Inventors: Peter Crane, Richfield, MN (US); Anthony P. Sannino, Longmont, CO (US); Zine-Eddine Boutaghou, Vadnais Heights, MN (US); Mark J. Schaenzer, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 386 days.

(21) Appl. No.: 09/809,714

(22) Filed: Mar. 15, 2001

Related U.S. Application Data

(60) Provisional application No. 60/197,225, filed on Apr. 14, 2000.

(51) Int. Cl.[7] .............................. G11B 21/02; G11B 5/60
(52) U.S. Cl. .................... 360/75; 360/236.1; 360/236.3; 360/237.1
(58) Field of Search ........................... 360/235.8, 235.9, 360/236.1, 236.2, 236.3, 236.6, 236.7, 236.8, 236.9, 237, 237.1, 25, 31, 75, 53, 235.1, 294.7

(56) References Cited

U.S. PATENT DOCUMENTS

| | | | |
|---|---|---|---|
| 4,734,803 A | 3/1988 | Nishihira | 360/103 |
| 5,021,906 A | 6/1991 | Chang et al. | 360/103 |
| 5,062,017 A | 10/1991 | Strom et al. | 360/103 |
| 5,128,822 A | 7/1992 | Chapin et al. | 360/103 |
| 5,196,973 A | 3/1993 | Chapin et al. | 360/103 |
| 5,200,868 A | 4/1993 | Chapin et al. | 360/103 |
| 5,212,608 A | 5/1993 | Yoneoka | 360/103 |
| 5,287,235 A | 2/1994 | Cunningham et al. | 360/103 |
| 5,343,343 A | 8/1994 | Chapin | 360/103 |

(List continued on next page.)

FOREIGN PATENT DOCUMENTS

| | | |
|---|---|---|
| EP | 600 348 A2 | 11/1992 |
| JP | 2-53256 | 8/1988 |
| JP | 3-12854 | 6/1989 |

OTHER PUBLICATIONS

Seagate Internal Report, V.D. Khanna and F. Hendriks, "Programmable Air Bearing Sliders for Magnetic Storage©", pp. 43–48.

S. Lu, H.M. Stanley, D.B. Bogy, "Design, Simulation, Fabrication and Measurement of a 25 NM, 50% Slider", IEEE Transactions of Magnetics, vol. 31, No. 6, Nov. 1995, pp. 2852–2954.

V.D. Khanna, F. Hendriks and A. Praino, "Programmable Air Bearing Sliders", IEEE Transactions on Magnetics, vol. 27, No. 6, Nov. 1991, pp. 5145–5147.

*Primary Examiner*—Andrew L. Sniezek
(74) *Attorney, Agent, or Firm*—Westman, Champlin & Kelly

(57) ABSTRACT

A slider is provided for actively controlling a fly height of the slider relative to a data storage disc during operation of a data storage system. The slider includes a slider body having front and back surfaces, a length and a crown curvature on the front surface along the length. The slider also includes first and second elongated rails which are positioned on the front surface along the length of the slider body and form first and second bearing surfaces. Each bearing surface includes a leading portion, a trailing portion and a waist portion, wherein the waist portion is wider than the leading and trailing portions and has a maximum width within a middle half of the length of the slider body. A deformable material is positioned on the slider body having a dimension that is changeable in response to an electrical control signal applied in a deformable material, wherein a change in the dimension causes a change in the crown curvature.

20 Claims, 10 Drawing Sheets

U.S. PATENT DOCUMENTS

| | | |
|---|---|---|
| 5,396,386 A | 3/1995 | Bolasna et al. ............. 360/103 |
| 5,396,387 A | 3/1995 | Murray ....................... 360/103 |
| 5,473,485 A | 12/1995 | Leung et al. ............... 360/103 |
| 5,488,524 A | 1/1996 | Cunningham ............... 360/103 |
| 5,490,026 A | 2/1996 | Dorius et al. ............... 360/103 |
| 5,515,219 A | 5/1996 | Ihrke et al. ................. 360/103 |
| 5,625,513 A | 4/1997 | Utsunomiya et al. ....... 360/103 |
| 5,636,088 A * | 6/1997 | Yamamoto et al. ......... 360/104 |
| 5,986,850 A | 11/1999 | Wang et al. ................. 360/103 |
| 6,130,807 A | 10/2000 | Marchon .................... 360/135 |
| 6,246,552 B1 | 6/2001 | Soeno et al. ............. 360/294.4 |
| 6,292,332 B1 * | 9/2001 | Peng ....................... 360/236.8 |
| 6,466,409 B1 * | 10/2002 | Baba et al. .............. 360/236.3 |
| 6,477,013 B1 * | 11/2002 | Kang et al. .............. 360/236.3 |

\* cited by examiner

SLIDER AND METHOD FOR ACTIVELY CONTROLLING CROWN CURVATURE

CROSS-REFERENCE TO RELATED APPLICATION

This application claims priority from U.S. Provisional Application No. 60/197,225, filed Apr. 14, 2000, and entitled "BARREL-SHAPED RAILS AAB FOR INCREASED CROWN SENSITIVITY IN CROWN-INDUCED ACTIVE PTFH APPLICATIONS".

FIELD OF THE INVENTION

The present invention is related to disc drive data storage systems and, more particularly, to an apparatus and method for actively controlling curvature of a transducing head, such as a hydrodynamic bearing slider.

BACKGROUND OF THE INVENTION

A typical hard disc drive includes one or more rigid discs coated with a magnetizable medium for storage of digital information in a plurality of circular, concentric data tracks. The discs are mounted on a spindle motor, which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry.

The head gimbal assembly includes a gimbal (or flexure) and a slider. The gimbal provides a resilient connection that allows the slider to pitch and roll while following the topography of the disc. The slider includes a slider body having a bearing surface, such as an air bearing surface, which faces the disc surface. As the disc rotates, the air pressure between the disc and the air bearing surface increases, which creates a hydrodynamic lifting force that causes the slider to lift and fly above the disc surface. The transducer is typically mounted at or near the trailing edge of the slider In some applications, the slider flies in close proximity to the surface of the disc. This type of slider is known as a "pseudo-contact" slider, since the bearing surface of the slider can occasionally contact the surface roughness of the disc. In other applications, the slider is designed to remain in direct contact with the disc surface with substantially no air bearing. These sliders are referred to as "contact recording" sliders.

It is often desirable to fabricate a slider such that the bearing surface has a positive curvature along the length and width of the slider. Length curvature is known as crown curvature. Width curvature is known as cross or camber curvature. The proper setting and control of crown and cross curvature improves fly height variability over varying conditions, improves wear on the slider and the disc surface, and improves takeoff performance by reducing stiction between the slider and the disc surface. In addition, the slider preferably has no twist about its longitudinal or transverse axes.

Curvature has been controlled in the past by lapping the bearing surface on a spherically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances. U.S. Pat. Nos. 5,442,850; 5,266,769; 5,982,583 and 6,073,337 disclose various other methods for setting slider curvature by altering surface stresses in the slider body material during fabrication of the slider body. The curvature of the slider is then fixed after fabrication.

However, increased hard disc drive recording density has been associated with a drastic decrease in a slider's fly height. In addition, media roughness or media "glide avalanche", a geometrical parameter used to qualify topography of media surface in production, has been significantly decreased. As a result, controlling fly height and measuring or qualifying media topography in a reliable manner have become more challenging. Media glide avalanche is typically measured with a glide head that is sensitive to contact with media defects and flies at a height comparable to the media glide avalanche. Recording heads usually fly at a greater height from the disc surface than a corresponding glide head.

Instead of relying on optimized passive, air bearing surfaces and fabricated crown curvatures to control slider fly heights, various approaches to actively control slider fly height during operation of a data storage system have been proposed both for recording heads and glide heads. U.S. Pat. No. 5,021,906 discloses a method of controlling slider fly height in which a central region of a conventional slider is deformed using a layer of piezoelectric material. However, conventional air bearing designs have been driven by the desire to minimize fly height sensitivity to manufacturing variations, including crown curvature. Thus, usefulness of this technique of actively controlling fly height by varying crown curvature has been limited.

An improved method and apparatus are desired for actively controlling slider fly height during operation of the disc drive.

SUMMARY OF THE INVENTION

In one aspect of the invention, a slider is provided for actively controlling the fly height of the slider relative to a data storage disc. The slider includes a slider body with front and back surfaces, a length and a crown curvature on the front surface along the length. In addition, first and second elongated rails positioned on the front surface form first and second bearing surfaces, respectively. Each of the bearing surfaces includes a leading portion, a trailing portion and a waist portion, wherein the waist portion is wider than the leading and trailing portions and has a maximum width within a middle half of the length of the slider body. A deformable material is positioned on the slider body and has a dimension that is changeable in response to an electrical control signal applied to the deformable material wherein a change in the dimension causes a change in the crown curvature.

Another aspect of the invention relates to a disc drive data storage system having a disc and a disc head slider. The disc is rotatable about a central axis and has a recording surface. The disc head slider carries a transducer at a fly height relative to the recording surface during rotation of the disc, wherein the fly height is sensitive to changes in a crown curvature of the disc head slider. The crown curvature of the disc head slider is actively altered in order to adjust the fly height during rotation of the disc, wherein an increase in the crown curvature causes an increase in the fly height.

Another aspect of the invention relates to a method for actively modifying a fly height of a transducer relative to a data storage disc. The method includes carrying the transducer with a slider, wherein the slider has front and back surfaces and a crown curvature along the front surface. The method further includes rotating the data storage disc relative to the slider and altering the crown curvature of the slider during rotation. Using this method, a positive change in the crown curvature results in a positive change in the fly height and a negative change in the crown curvature results in a negative change in the fly height.

DETAILED DESCRIPTION OF ILLUSTRATIVE EMBODIMENTS

Figure 1:
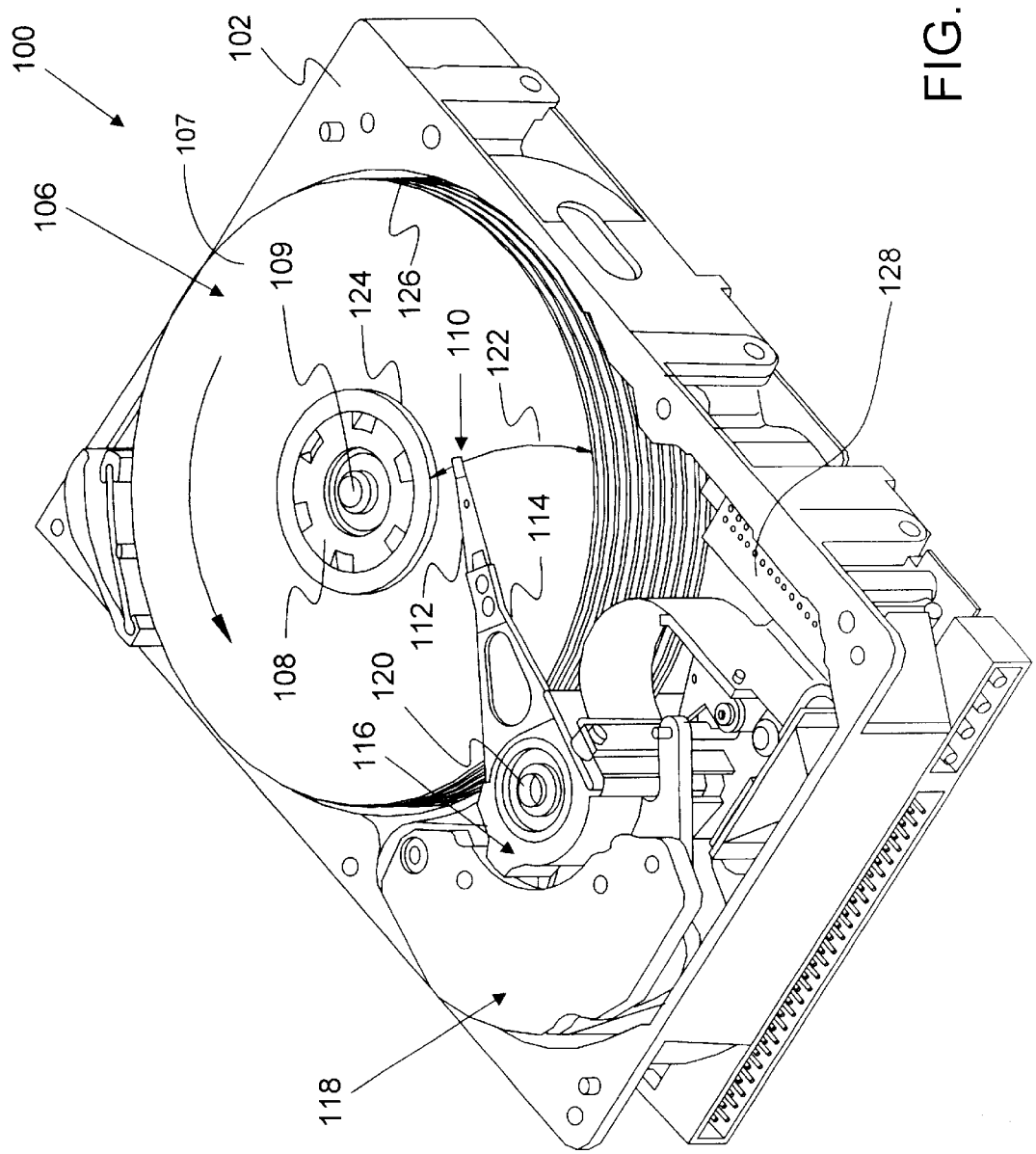
FIG. 1 is a perspective view of a disc drive in which a slider according to the present invention is useful.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, which creates a hydrodynamic lifting force that counteracts the load force provided by suspensions 112 and causes the sliders 110 to lift and fly above or in close proximity to the disc surfaces.

Figure 2:
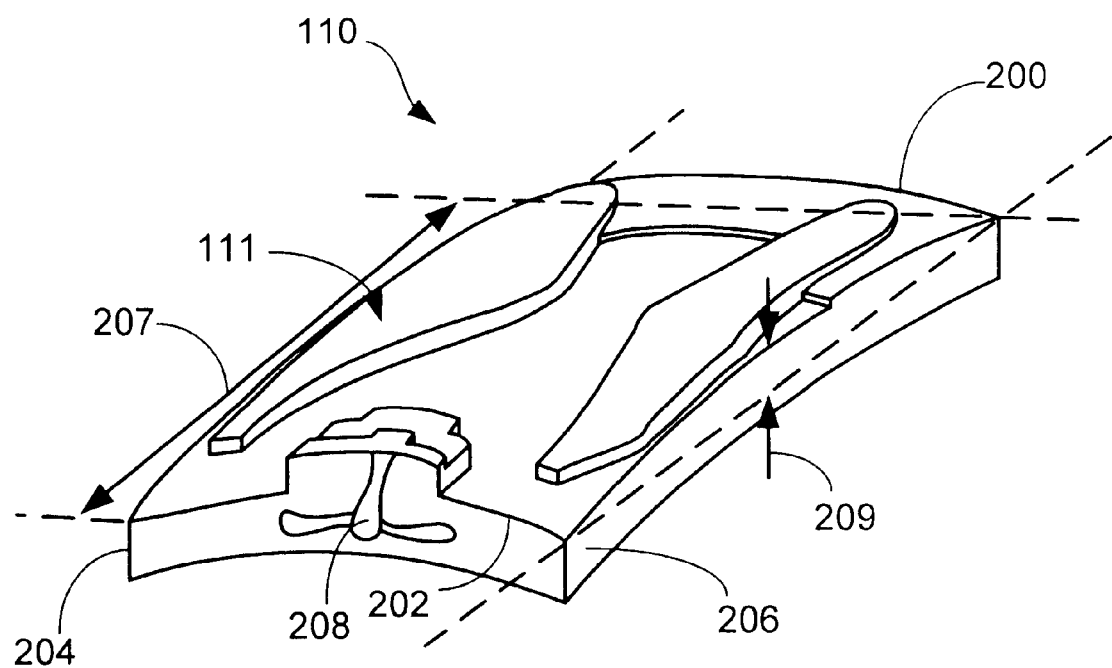
FIG. 2 is a perspective view of a slider having a bearing surface with a crown curvature, according to one embodiment of the present invention.

FIG. 2 is a perspective view of one of the disc head sliders 110, as viewed from a bearing surface 111. Slider 110 has a leading edge 200, a trailing edge 202 and side edges 204 and 206. Slider 110 has a length 207, measured from leading edge 200 to trailing edge 202. Slider 110 carries a read/write transducer 208, which is typically mounted along trailing edge 202, but can be positioned at other locations on slider 110 in alternative embodiments.

Slider 110 preferably has a positive "crown" curvature 209 along length 207. Crown curvature 209 is a measure of the curvature of bearing surface 111 along length 207. Crown curvature 209 is negative for a concave surface, positive for a convex surface and zero for a flat surface. A common method of measuring the crown curvature 209 is to measure the difference between the highest point along length 207 and the lowest point along length 207, for a surface having no height changes due to the surface geometry of bearing surface 111. A typical crown curvature value is on the order of zero to 1.5 microinches for a "30 series" slider having a length of 49 mils and a width of 39 mils. As described in more detail below, the crown curvature 209 of slider 110 is actively controlled during operation of disc drive 100 to control the flying height of slider 110 at or near transducer 208. This flying height is sometimes referred to as the "pole tip" or "mechanical close point" flying height. In addition, slider 110 has a specialized bearing surface geometry for increasing the sensitivity of the flying height to variations in the crown curvature 209 of slider 110. This specialized surface geometry can be modified in a number of ways for non-contact, direct-contact or pseudo-contact recording. The increased sensitivity to variations in crown curvature increases the effectiveness of crown-induced active flying height control.

Figure 3:
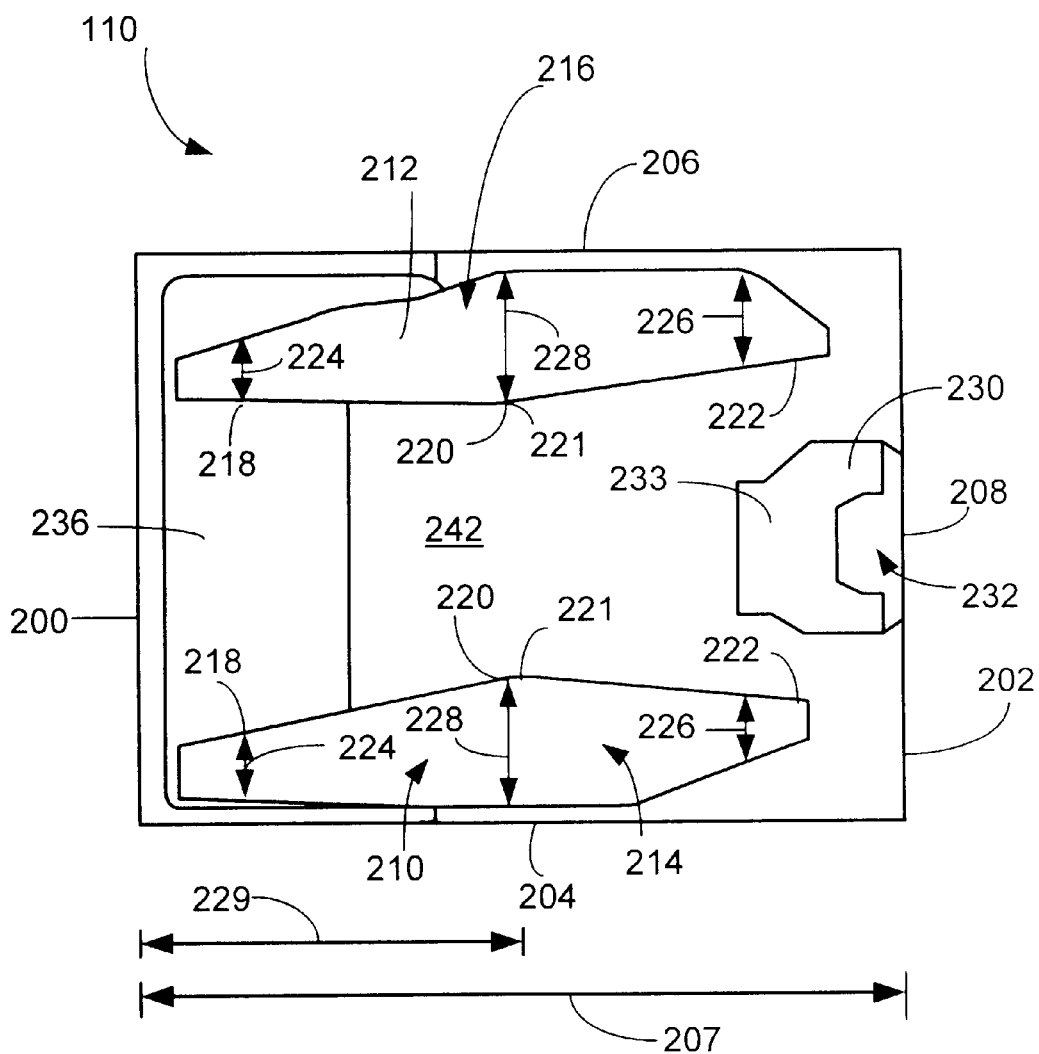
FIG. 3 is a bottom plan view of the slider shown in FIG. 2.

FIG. 3 is a bottom plan view of slider 110 of FIG. 2, as viewed from the surface of disc 107. Slider 110 has elongated, raised side rails 210 and 212 which are positioned along side edges 204 and 206, respectively, and extend generally from leading edge 200 toward trailing edge 202. Side rails 210 and 212 form longitudinal bearing surfaces 214 and 216, respectively. Bearing surfaces 214 and 216 have a leading portion 218, a waist portion 220 and a trailing portion 222.

Center pad or rail 230 is positioned at trailing edge 202 between side edges 204 and 206, along trailing slider edge 202. Center pad 230 is positioned equidistant from side edges 204 and 206. In alternative embodiments, center pad 230 can be skewed or offset with respect to a midpoint between edges 204 and 206. Center pad 230 has a bearing surface 232 and a leading step surface 233, which assists bearing surface 232 in developing additional positive pressure at trailing edge 202. Leading step surface 233 is recessed from bearing surface 232 by a step depth of 0.1 to 0.3 microns, for example. Center pad 230 supports transducer 208 near trailing edge 202. When transducer 208 is placed at or near trailing edge 202, transducer 208 is located near the closest point on slider 110 to the surface of disc 107 (shown in FIG. 1) when slider 110 flies with a positive pitch angle. With a positive pitch angle, trailing edge 202 is closer to the surface of disc 107 than leading edge 200.

A cavity dam 236 extends between rails 210 and 212, along leading edge 200. Cavity dam 236 is recessed from side rails 210 and 212 by a step depth of about 0.1 to 0.3 microns, for example. In an alternative embodiment (not shown) cavity dam 236 is formed with a tapered leading edge. A subambient pressure cavity 242 is defined by cavity dam 236, between side rails 210 and 212. Subambient pressure cavity 242 is recessed from bearing surfaces 214 and 216 by a depth of 1 to 3 microns, for example.

In order to increase the efficiency and usefulness of fly height control through active changes in the crown curvature 209 (shown in FIG. 2) of slider 110, bearing surfaces 214 and 216 each have a generally barrel shape along its length that increases the fly height sensitivity of slider 110 to changes in crown curvature 209. However, the overall geometry style of slider 110 maintains a high air bearing stiffness in order to maintain a low sensitivity to manufacturing variations other than crown curvature or vibrations experienced during operation of disc drive 100. Accordingly, leading portion 218 and trailing portion 222 have widths 224 and 226, respectively, which are less than a maximum width 228 along waist portion 220. Widths 224 and 226 may be equal to one another or different from one another. Bearing surfaces 214 and 216 progressively widen from leading portion 218 to maximum width 228 along waist portion 220 and then progressively narrow from maximum width 228 toward trailing portion 222. Maximum width 228 is greater than widths 224 and 226 and is positioned at a distance 229 from leading edge 200. In one embodiment, distance 229 is between about one-quarter to three-quarters the length 207 of slider 110. In this range, maximum width 228 is positioned at or near the slider midpoint.

During operation, when the rotating disc drags air beneath slider 110, the air becomes pressurized along bearing surfaces 214 and 216. In a typical slider, where the bearing surfaces are narrower along the waist portions than the leading and trailing portions of the slider, the air pressure decreases along the waist portions. This creates pressure peaks near the four corners of the slider, resulting in a stiff bearing having a flying height that is relatively insensitive to changes in crown curvature. In contrast, slider 110 develops pressure peaks along waist portions 228, rather than along leading and trailing portions 218 and 222. This causes the flying height of slider 110 to be more sensitive to crown curvature.

Figure 4A:
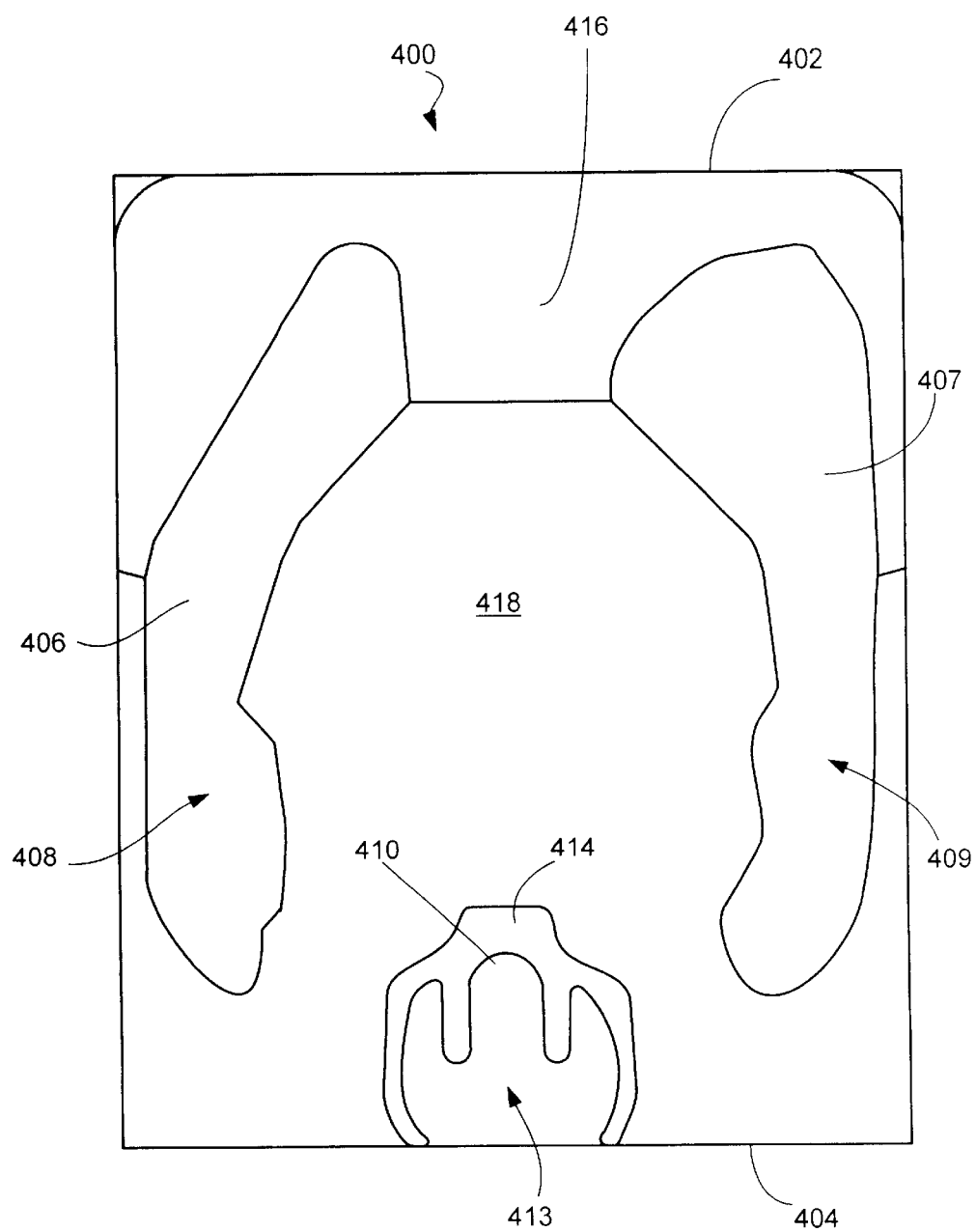
FIGS. 4A–4D are plan views of alternative bearing geometry styles with which the fly height sensitivity to crown curvature of the slider shown in FIGS. 2 and 3 was compared.

In order to illustrate the increased sensitivity to crown curvature, the sensitivity of slider 110 was compared with the sensitivity of other sliders having alternative geometry styles in computer simulations. The alternative geometry styles are illustrated in FIGS. 4A–4D. FIG. 4A illustrates a slider 400 having leading edge 402 and trailing edge 404. Slider 400 also includes hour-glass shaped rails 406 and 407, which form bearing surfaces 408 and 409, respectively. Center rail 410 is positioned at trailing edge 404 and forms bearing surface 413. Center rail 410 also includes step surface 414, which assists bearing surface 413 in developing additional positive pressure at trailing edge 404. Step surface 414 is recessed from bearing surface 413 by a step depth of 0.1 to 0.3 microns, for example.

A cavity dam 416 extends between rails 406 and 407, along leading edge 402. Cavity dam 416 is recessed from side rails 406 and 407 by a step depth of about 0.1 to 0.3 microns, for example. A subambient pressure cavity 418 is defined by cavity dam 416, between side rails 406 and 407. Subambient pressure cavity 418 is recessed from bearing surfaces 408 and 409 by a depth of 1 to 3 microns, for example.

Figure 4B:
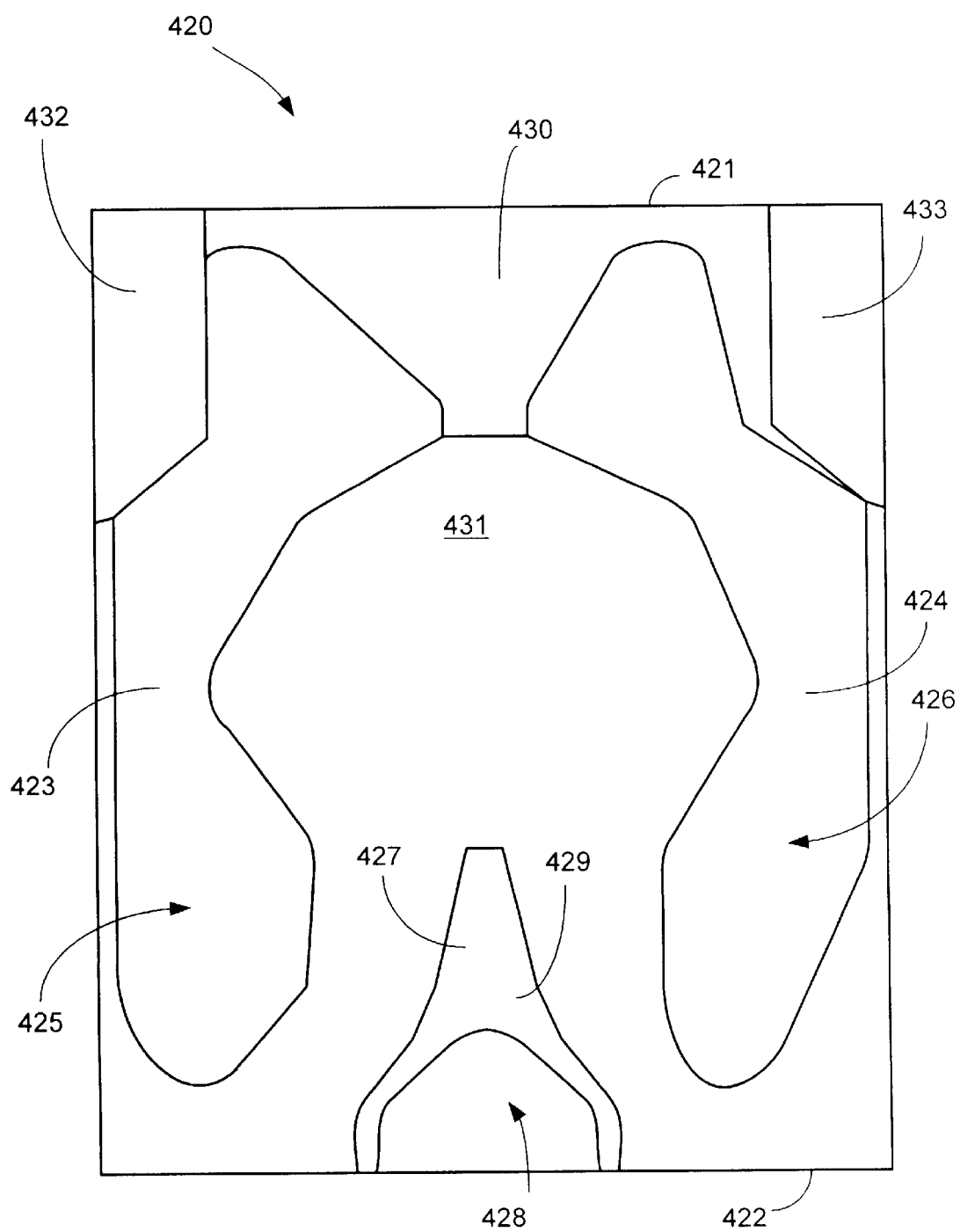

FIG. 4B illustrates a slider 420 having leading edge 421 and trailing edge 422. Slider 420 also includes hour-glass shaped rails 423 and 424, which form bearing surfaces 425 and 426, respectively. Center rail 427 is positioned along trailing edge 422 and forms bearing surface 428. Center rail 427 also has a leading step surface 429, which assists bearing surface 428 in developing additional positive pressure at trailing edge 422. Leading step surface 429 is recessed from bearing surface 428 by a step depth of 0.1 to 0.3 microns, for example.

A cavity dam 430 extends between rails 423 and 424 along leading edge 421. Cavity dam 430 is recessed from side rails 423 and 424 by a step depth of about 0.1 to 0.3 microns, for example. A subambient pressure cavity 431 is defined by cavity dam 430, between side rails 423 and 424. Subambient pressure cavity 431 is recessed from bearing surfaces 425 and 426 by a depth of 1 to 3 microns, for example. Raised surfaces 432 and 433 are also provided on slider 420.

Figure 4C:
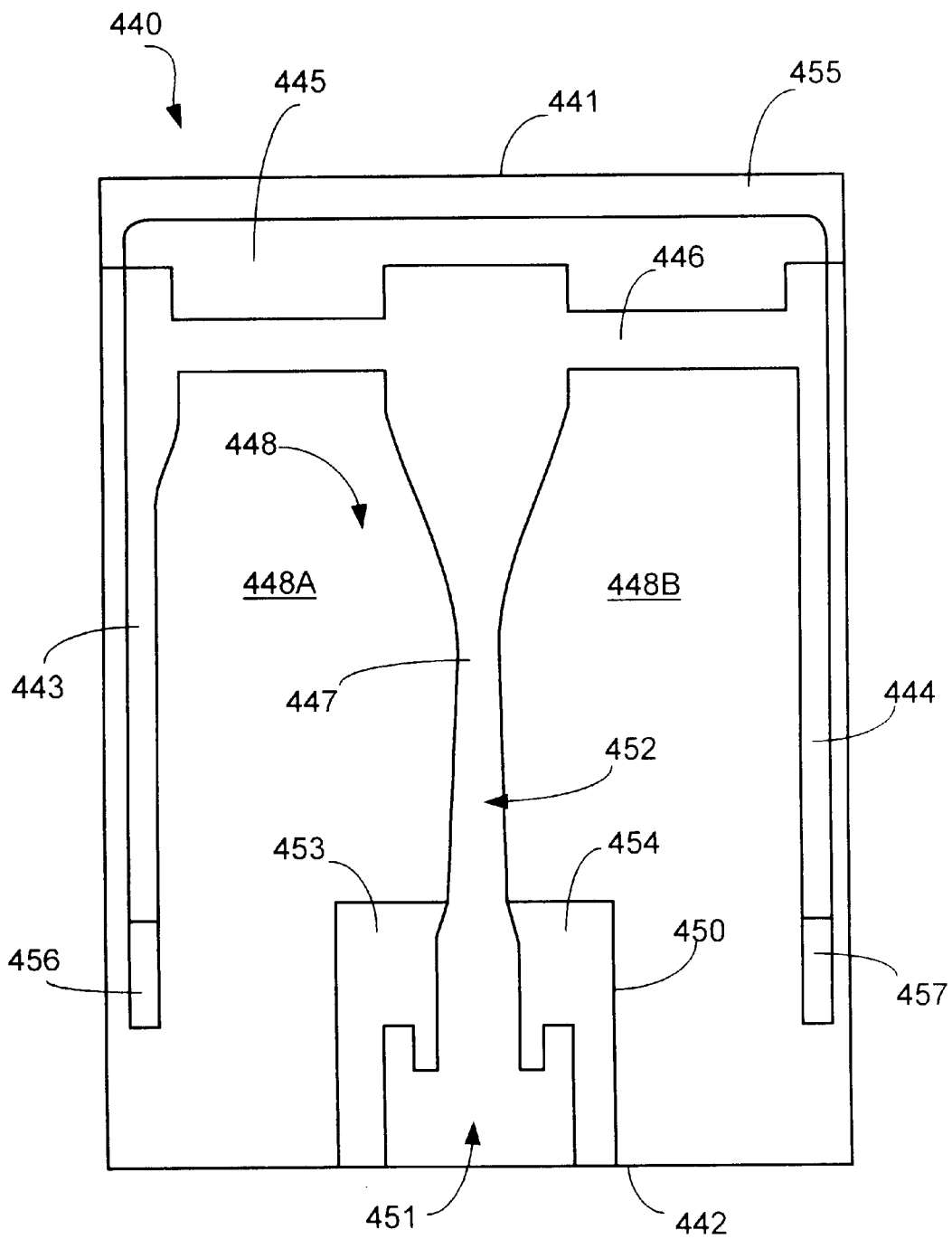

FIG. 4C illustrates a slider 440 having straight rails. Slider 440 includes leading edge 441 and trailing edge 442. Slider 440 includes straight side rails 443 and 444, leading step surface 445, cavity dam 446 and center rail 447. Center rail 447 extends from cavity dam 446 toward trailing edge 442, between side rails 443 and 444. Cavity dam 446 defines a subambient pressure cavity 448 between side rails 443 and 444 that is divided into first and second cavity portions 448A and 448B by center rail 447.

A raised center pad 450 is formed within raised center rail 447, generally along trailing edge 442. Raised center pad 450 has a bearing surface 451 formed on center rail 447. Leading step surfaces 453 and 454 are raised from cavity portions 448A and 448B and are recessed from bearing surfaces 451 and 452 for prepressurizing air flow received from cavity portions 448A and 448B, respectively. Step surfaces 455, 456 and 457 also contribute to the bearing geometry style of slider 440.

Figure 4D:
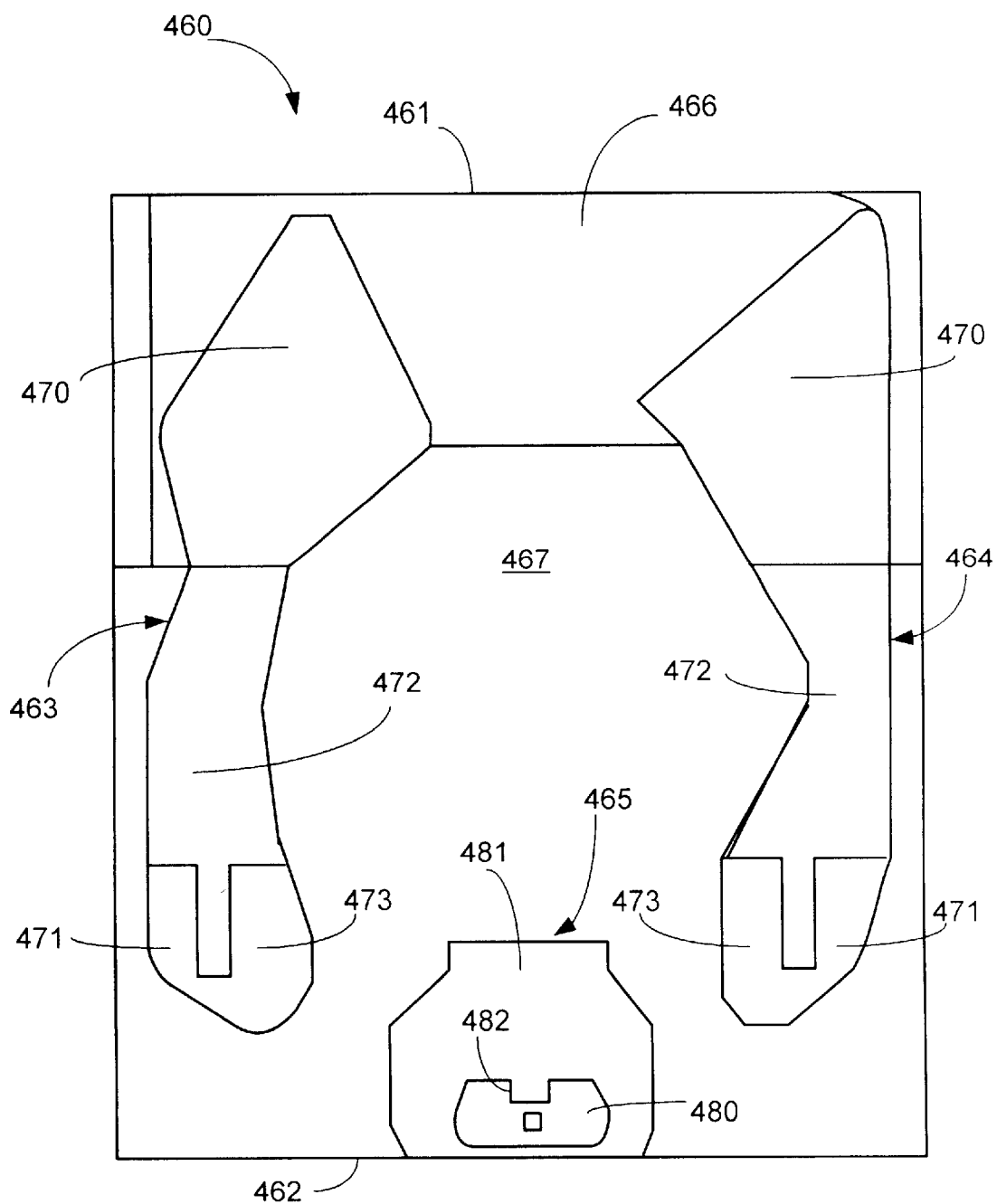

FIG. 4D illustrates a slider 460 having leading edge 461, a trailing edge 462, side rails 463 and 464, center pad 465, cavity dam 466 and subambient pressure cavity 467. Side rails 463 and 464 have leading and trailing bearing surfaces 470 and 471, respectively, and recessed step surfaces 472 positions along the waist sections of the rails. Trailing bearing surfaces 471 include convergent channel features 473, which are coplanar and contiguous with recessed step surfaces 472 for generating localized pressure peaks along trailing bearing surfaces 471. Center pad 465 includes bearing surface 480, leading, recessed step surface 481 and a convergent channel feature 482 formed within bearing surface 480, which is similar to convergent channel features 473. Cavity dam 466 extends between side rails 463 and 464 along leading edge 461, and is recessed from bearing surfaces 470, 471, and 480 by a step depth of about 0.24 microns. Step surfaces 472, 481 and 466 are substantially coplanar with one another.

As compared to the sliders shown in FIGS. 4A–4D, slider 110 of FIG. 3 presents a bearing geometry that exhibits increased crown sensitivity, which is a ratio defined by a change in the fly height of the slider divided by a change in the crown height of the slider. Table 1 displays the crown sensitivity of slider 110 as compared with the crown sensitivities of sliders 400, 420, 440 and 460 as illustrated in FIGS. 4A–4D. The data in Table 1 was developed with computer simulations using various combinations of spindle speed, pre-load force and the geometry styles illustrated in FIGS. 3 and 4A–4D at fixed fly heights to measure crown sensitivity. As displayed in Table 1, an increase of up to 80% in crown sensitivity over the most sensitive of the sliders shown in FIGS. 4A–4D can be achieved using the bearing geometry of slider 110.

TABLE 1

| Slider | Bearing Geometry Style | Spindle Speed (rpm) | Pre-Load (gmf) | Crown Sensitivity (µin fly height/µin curvature) |
|---|---|---|---|---|
| 400 | NPAB Hour Glass Shaped-Rails | 4500 | 1.5 | 0.15 |
| 420 | NPAB Hour Glass Shaped-Rails | 7200 | 2.5 | 0.30 |
| 440 | NPAB Straight Rails | 10,000 | 0.5 | 0.09 |
| 460 | NPAB Hour Glass Shaped-Rails | 12,000 | 2.5 | 0.22 |
| 110 | Barrel-Shaped Rails | 10,000 | 2.5 | 0.55 |

Figure 5:
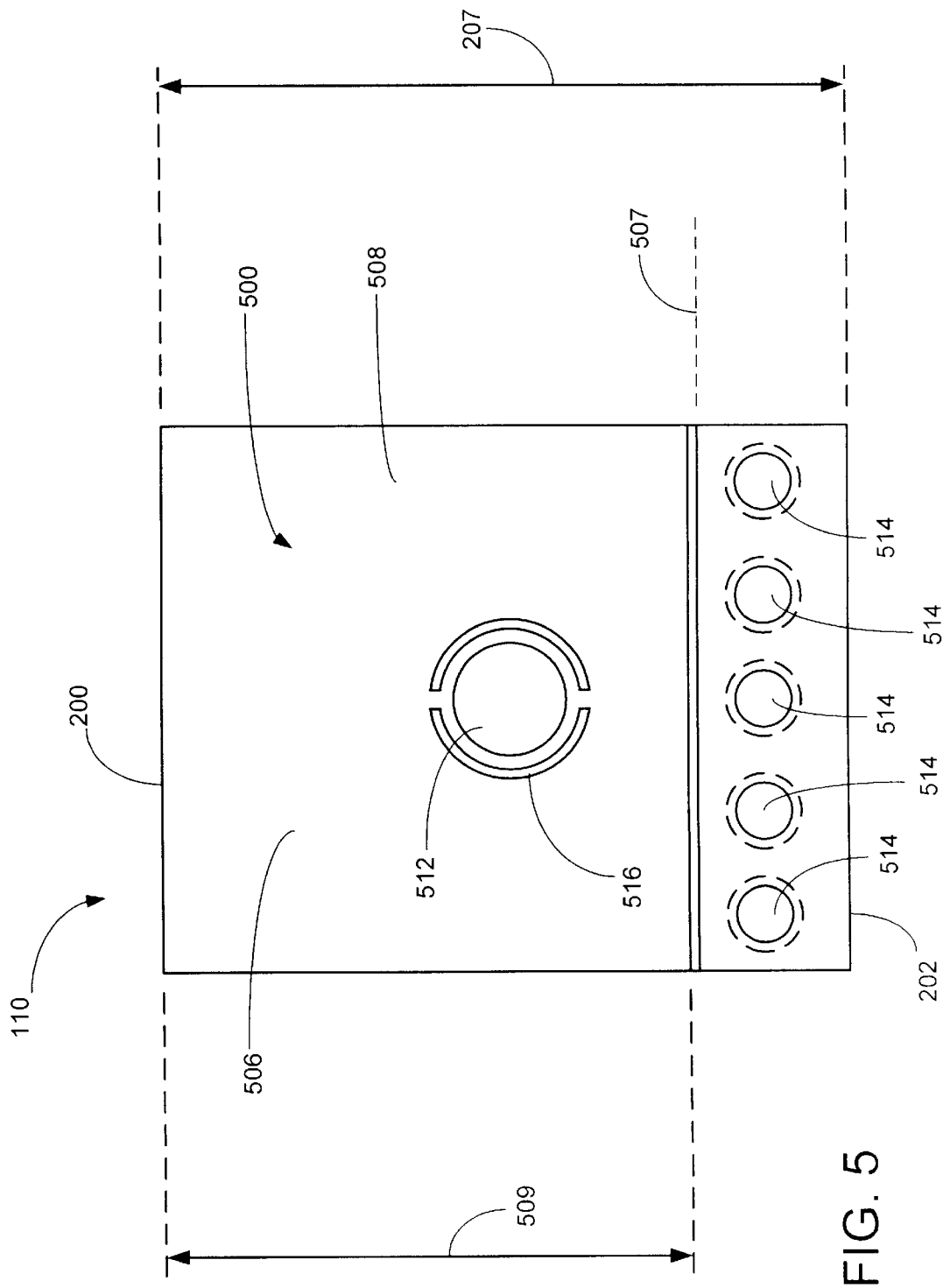
FIG. 5 is a plan view of the slider shown in FIGS. 2 and 3 from a back surface of the slider according to one embodiment of the present invention.

In order to alter the crown curvature of a slider, a piezoelectric deformable material is positioned on the back surface of the slider. FIG. 5 illustrates slider 110 as viewed from back surface 500. Slider 110 includes leading edge 200 and trailing edge 202. A recessed area 506 extends along the length 207 of the slider from the leading edge 200 to a location 507 on back surface 500 that is spaced from trailing edge 202. Piezoelectric deformable material 508 is positioned on the recessed area 506. Piezoelectric deformable material 508 has a length dimension 509, which changes in response to an electrical control signal applied to the material through bond pad 512. In one embodiment, the slider substrate serves as an electrical return path for the signal applied to deformable material 508 through bond pad 512. The electrical signal causes the length 509 of the deformable material 508 to increase or decrease depending on the polarity of the applied signal. Since deformable material 508 is attached to the back surface 500 of slider 110, a decrease in length 509 produces a bending moment that increases the slider crown curvature 209. (shown in FIG. 2). Similarly, an increase in length 509 produces a bending moment that decreases slider crown curvature 209. Contact pads 514 are used to provide electrical signals to transducer 208 (shown in FIG. 2). Reference numeral 516 represents a connection between deformable material 508 and suspension 112 (shown in FIG. 1). In one embodiment, suspension 112 is adhered to deformable material 508. However, any method of attachment can be used.

Figure 6A:
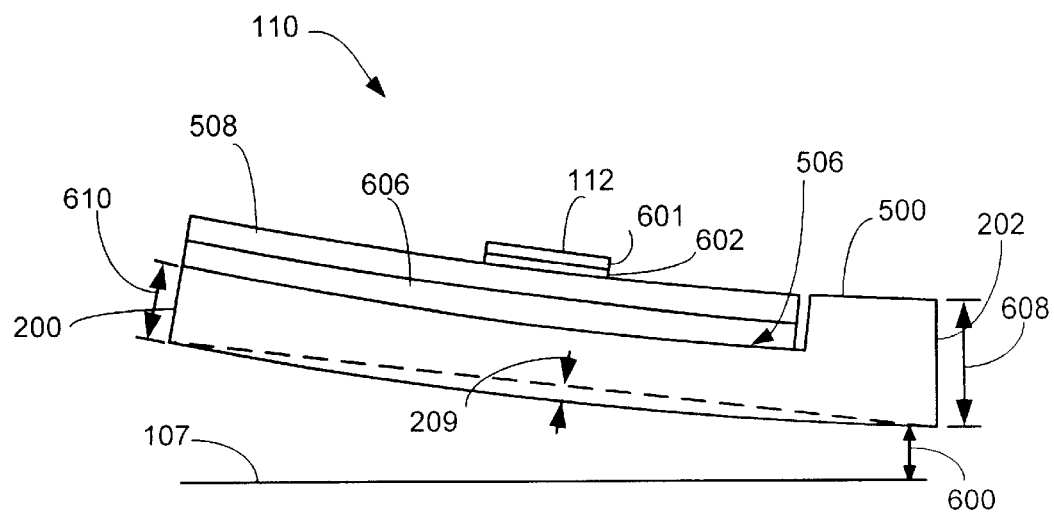
FIGS. 6A–6B are side views of the slider shown in FIGS. 2 and 3 according to the present application.

FIG. 6A illustrates a side view of slider 110. Slider 110 is shown flying above the surface of disc 107 at fly height 600. Suspension 112 assists in suspending slider 110 and comprises attachment portion 601 and adhesive layer 602. Deformable material 508 is positioned on recessed area 506 of slider 110 and is adhered to slider 110 with adhesive 606. Recessed area 506 reduces the thickness of slider 110 from an original thickness 608 along trailing edge 202 to a reduced thickness 610 along leading edge 200. In order to alter the fly height 600 of slider 110 during rotation of disc 107, a signal is applied to deformable material 508 through bond pad 512 (shown in FIG. 5). The signal causes deformable material 508 to change dimension along its length 509, which subsequently alters the crown curvature 209 of slider 110.

Figure 6B:
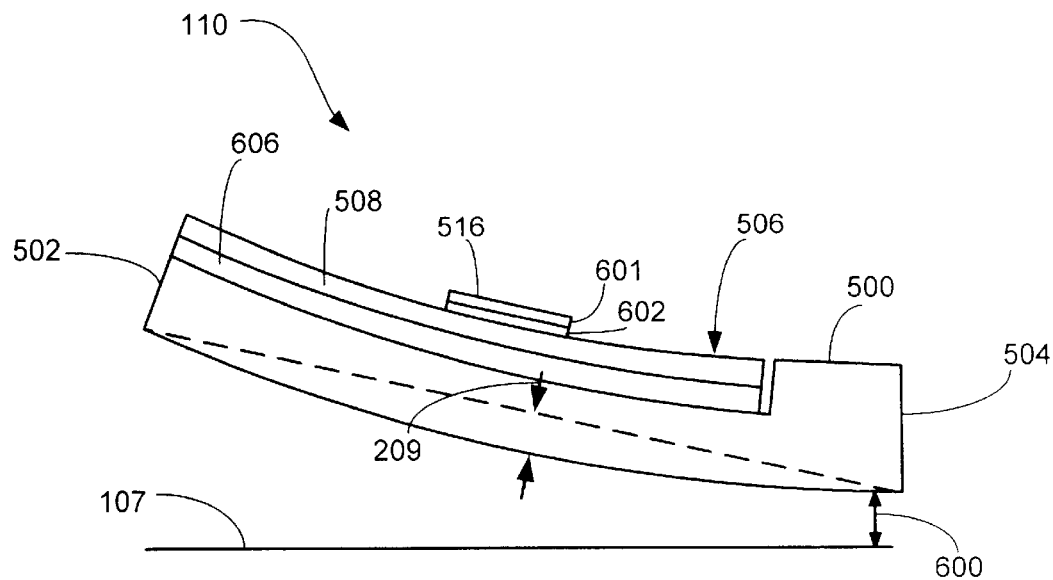

FIG. 6B illustrates a side view of slider 110 in a deformed state. As illustrated, the crown curvature 209 of slider 110 is increased after an appropriate control signal has been applied to deformable material 508. The increase in crown curvature 209 creates a situation where fluid pressure causes slider 110 to be urged upward, creating an increased fly height 600. A subsequent decrease in crown curvature 209 decreases the fly height 600 of slider 110. Ultimately, crown curvature 209 can be controlled in order to maintain a desired fly height through the control signal applied to the deformable material.

Figure 7:
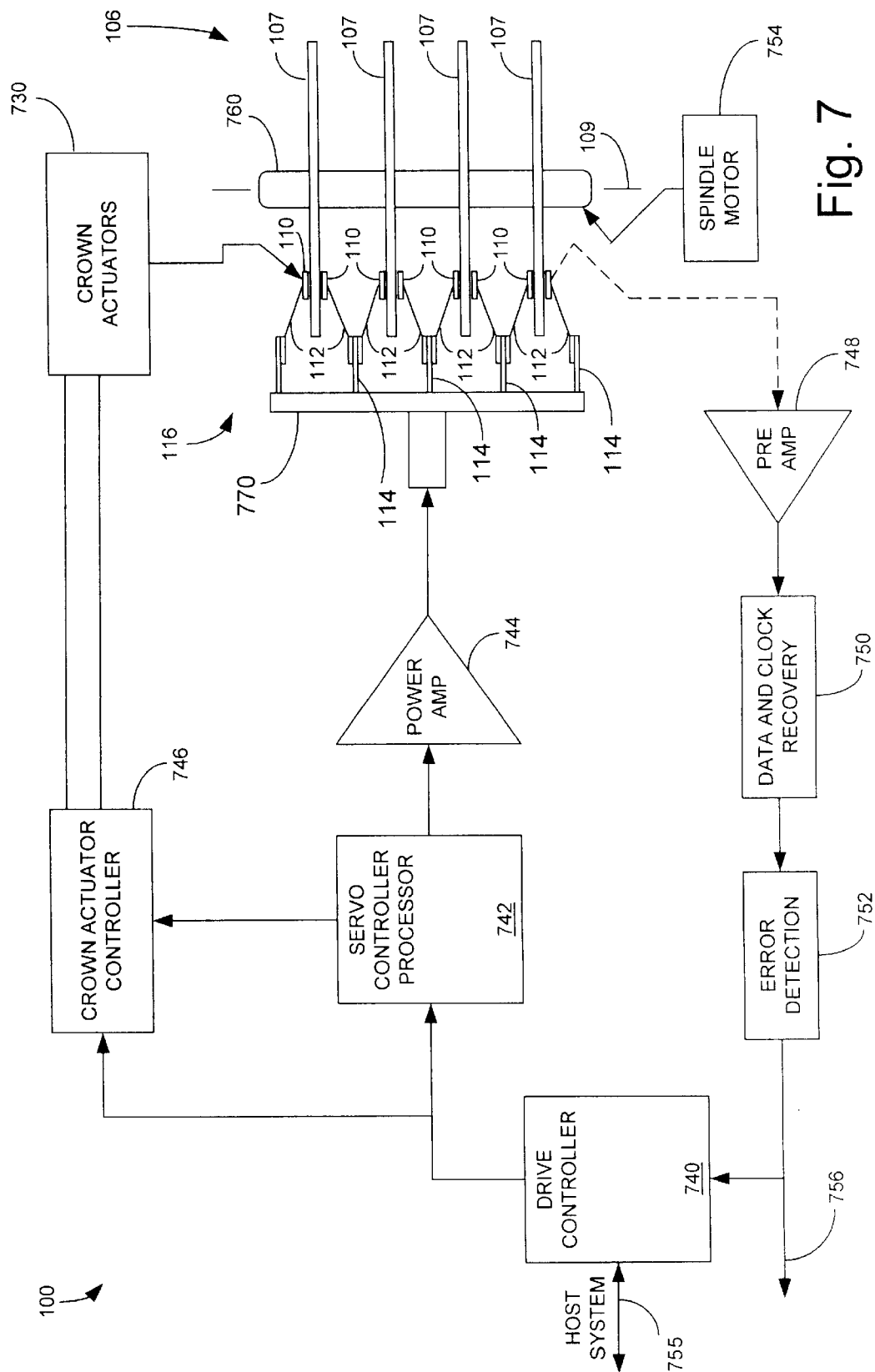
FIG. 7 is a block diagram of a disc drive, which illustrates control circuitry for generating crown actuation control signals that are applied to each slider in the disc drive, according to one embodiment of the present invention.

FIG. 7 is a block diagram of disc drive 100, which illustrates control circuitry for positioning actuator 116 for generating the crown actuation control signals that are applied to each slider 110 in the disc drive, according to one embodiment of the present invention. Disc drive 100 includes drive controller 740, servo control processor 742, power amplifier 744, actuator 116, crown actuator controller 746, crown actuators 730, disc pack 106, preamplifier 748, data and clock recovery circuit 750, and error detection circuit 752 and spindle motor 754. Crown actuators 730 include the deformable material 508 shown in FIGS. 5 and 6 that is positioned on the back surface of each of the sliders 110. Drive controller 740 is typically a microprocessor or digital computer, and is coupled to a host system or another drive controller which controls one or more of drives.

Disc pack 106 includes spindle 760 which supports a plurality of coaxially arranged discs 107 (for simplicity, only four of which are shown). Spindle motor 754 rotates discs 107 about axis 109. Each disc 107 has first and second surfaces with concentric data tracks for storing data in the form of magnetic flux reversals which are encoded on the tracks.

Actuator 116 includes base 770 which supports the plurality of track accessing arms 114. Each of the track accessing arms 114 is coupled to at least one of the suspensions 112, which supports a slider 110 proximate to a corresponding disc surface for accessing data within tracks on the disc surface. As previously mentioned, each slider 110 carries a transducing head. The control function for crown actuators 730 can be implemented within drive controller 740, servo control processor 742 or a separate crown actuator controller 746, as shown in FIG. 7. Crown actuator controller 746 can be mounted with the electronic circuitry 128 (shown in FIG. 1) within the disc drive housing, on actuator 116, or in-situ with each of the crown actuators.

During operation, drive controller 740 receives a command signal from the host system over bus 755 which indicates that a certain portion of one or more of discs 107 are to be accessed. In response to the command signal, drive controller 740 provides servo control processor 742 with a position signal, which indicates a particular cylinder over which actuator 116 is to position suspensions 112 and their associated heads. Servo control processor 742 converts the position signal into an analog signal which is amplified by power amplifier 744 and is provided to actuator 116. In response to the analog position signal, actuator 116 positions suspensions 112 and their associated heads over the desired cylinder.

Drive controller 740 also places preamplifier 748 in a read mode and indicates which read head or heads the data will be read from. The selected read head generates a read signal containing data which was encoded on the disc surface. Preamplifier 748 amplifies the read signal and provides it to data and clock recovery circuit 750. Data and clock recovery circuit 750 recovers the data from the read signal and provides the data to error detection circuit 752. Circuit 752 detects whether any errors have occurred in the data read back from the disc. Correctable errors are corrected by error detection circuit 752 and are provided to drive controller 740 over bus 756 in a known manner. Alternatively, correctable errors can be corrected by drive controller 740, or a combination of both drive controller 740 and error detection circuit 752. In a sector servo positioning drive, for example, a portion of each sector has position information which is read by the read head and provided to servo control processor 742. The position information gives tuning feedback to the servo control processor, which corrects the analog position signal provided to power amplifier 744.

In accordance with one embodiment of the present invention, the read signal is also used as a feedback signal for controlling the fly heights of sliders 110. The read signal produced by each head has one or more characteristics that is a function of the fly height of that head. For example, the these characteristics can include amplitude of pulses in the read signal, width of pulses in the read signal, a characteristic in the read signal that represents presence of thermal asperities on the disc surface, and a characteristic in the read signal that represents off-track position error of the transducer relative to a desired radial position on the disc. In one embodiment, if thermal asperities on the disc surface are too large, the fly height of slider 110 can be increased.

The chosen characteristic can be detected within one or more of the circuits in the read channel, such as preamplifier 748, data and clock recovery circuit 750 and error detection circuit 752, and fed back to drive controller 740, servo control processor 742 or crown actuator controller 746. Based on the detected characteristic, fly height information is fed back to crown actuator controller 746. Based on the actual fly height, as represented by the fly height information, and the desired fly height for the slider, controller 746 generates the appropriate fly height control signals to crown actuators 730. These signals can include a current (or voltage) having a level and polarity that is required to achieve a crown curvature that results in the desired fly height, for example. A unique signal can be generated for each slider 110 or a common signal can be generated for all of the sliders 110.

In an alternative embodiment, crown actuator controller 746 controls the crown curvatures of the sliders 110 based on the position signal provided by drive controller 740 to servo control processor 742. For example, without active crown actuation, sliders 110 can have different fly heights at different radial positions over the disc surface due to changes in the skew angle between the slider and the disc's tangential velocity and due to changes in the linear velocity of the disc surface. These changes in fly height can be reduced by controlling the crown curvature of each slider 110, and thus its fly height, based on the position signal. Alternatively, the radial position of the slider 110 can be detected through the read channel based on the servo data recovered by data and clock recovery circuit 750. In another embodiment, crown actuator controller 746 compensates for thermal effects on the crown curvature of a given slider 110. As these thermal effects alter the crown curvature, these thermal effects can be detected by detecting the resulting changes in the fly height of the slider through changes in the characteristics of the read signal. Various other methods and control functions can also be used to control the fly height through crown actuators 730. It should be understood that the actual fly height of a given slider can be detected through either existing circuitry in a typical read channel or through specialized circuitry coupled to the read channel.

In summary, one aspect of the present invention relates to a slider 110 for actively controlling the fly height 600 of the slider 110 relative to a data storage disc 107. The slider 110 includes a slider body with front and back surfaces 111 and 500, a length 207 and a crown curvature 209 on the front surface 111 along the length 207. In addition, first and second elongated rails 210 and 212 positioned on the front surface 111 form first and second bearing surfaces 214 and 216, respectively. Each of the bearing surfaces 214 and 216 includes a leading portion 218, a trailing portion 222 and a waist portion 220, wherein the waist portion 220 is wider than the leading and trailing portions 218 and 222 and has a maximum width 228 within a middle half of the length 207 of the slider body. A deformable material 508 is positioned on the slider body and has a dimension 509 that is changeable in response to an electrical control signal applied to the deformable material 508 wherein a change in the dimension 509 causes a change in the crown curvature 209.

Another aspect of the invention relates to a disc drive data storage system 100 having a disc 107 and a disc head slider 110. The disc 107 is rotatable about a central axis 109 has a recording surface. The disc head slider 110 carries a transducer 208 at a fly height 600 relative to the recording surface during rotation of the disc 107. The fly height 600 is sensitive to changes in a crown curvature 209 of the disc head slider 110. The crown curvature of the disc head slider 110 is actively altered in order to adjust the fly height 600 during rotation of the disc 107. An increase in the crown curvature 209 causes an increase in the fly height 600.

Another aspect of the invention relates to a method for actively modifying a fly height 600 of a transducer 208 relative to a data storage disc 107. The method includes carrying the transducer 208 with a slider 110, wherein the slider 110 has front and back surfaces 111 and 500 and a crown curvature 209 along the front surface 111. The method further includes rotating the data storage disc 107 relative to the slider 110 and altering the crown curvature 209 of the slider 110 during rotation. Using this method, a positive change in the crown curvature 209 results in a positive change in the fly height 600 and a negative change in the crown curvature 209 results in a negative change in the fly height 600.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular bearing geometry may vary depending on the particular application for the disc head slider while maintaining substantially the same functionality without departing from the scope and spirit of the present invention. In addition, although the slider example described is a negative pressure slider, it will be appreciated by those skilled in the art that the teachings of the present invention can be applied to other types of sliders, such as positive pressure slider having no cavity dam and sliders having different numbers of rails and rail shapes without departing from the scope and spirit of the present invention. Also, the present invention can be used with any type of transducing head such as magnetic, magneto-resistive, optical or magneto-optical heads, for example.

What is claimed is:

1. A slider for actively controlling a fly height of the slider relative to a data storage disc, the slider comprising:

a slider body having a front surface, a back surface opposite to the front surface, a length, and a crown curvature on the front surface, along the length;

first and second elongated rails positioned on the front surface along the length of the slider body and forming first and second bearing surfaces, respectively, wherein each bearing surface comprises a leading portion, a trailing portion and a waist portion, wherein the waist portion is wider than the leading and trailing portions and has a maximum width within a middle half of the length of the slider body; and a deformable material positioned on the slider body and having a dimension that is changeable in response to an electrical control signal applied to the deformable material, wherein a change in the dimension causes a change in the crown curvature.

2. The slider of claim 1 and further comprising a cavity dam positioned on the front surface of the slider body between the first and second rails, and a subambient pressure cavity, which trails the cavity dam, between the first and second rails.

3. The slider of claim 1 wherein the deformable material comprises a layer of piezoelectric material positioned on the back surface of the slider, which is deformable along the slider length between first and second states, and wherein the crown curvature is different when the layer is in the first state than in the second state.

4. The slider of claim 1 wherein:

the slider further comprises a leading slider surface, a trailing slider surface, and a recessed area on the back surface, which extends along the slider length from the leading slider surface to a location on the back surface that is spaced from the trailing slider surface and which reduces a thickness of the slider along the recessed area and maintains the thickness adjacent the trailing slider surface; and the deformable material is positioned on the recessed area.

5. A disc drive data storage system comprising:

a disc rotatable about a central axis and having a recording surface; and disc head slider means for carrying a transducer at a flyheight relative to the recording surface duringrotation of the disc, wherein the fly height is sensitive to changes in a crown curvature of the disc head slider means, and comprising a deformable material having a dimension that is changeable in response to an electrical control signal applied to the deformable material to thereby alter the crown curvature and adjust the fly height during rotation of the disc, wherein an increase in the crown curvature causes an increase in the fly height.

6. The disc drive data storage system of claim 5 wherein the disc head slider means further comprises:

a slider body having a length, a front surface having the crown curvature along the length, and a back surface opposite to the front surface, wherein the deformable material is positioned on the back surface; and first and second elongated rails positioned on the front surface along the length of the slider body and forming first and second bearing surfaces, respectively, wherein each bearing surface comprises a leading portion, a trailing portion and a waist portion, wherein the waist portion is wider than the leading and trailing portions and has a maximum width within a middle half of the length of the slider body.

7. The disc drive data storage system of claim 6 wherein the deformable material comprises a layer of piezoelectric material positioned on the back surface of the slider body and is deformable along the slider length.

8. The disc drive data storage system of claim 6 wherein the disc head slider means further comprises a leading slider surface, a trailing slider surface, and a recessed area on the back surface, which extends along the slider length from the leading slider surface to a location on the back surface that is spaced from the trailing slider surface and which reduces a thickness of the slider along the recessed area and maintains the thickness adjacent the trailing slider surface and wherein the deformable material is positioned on the recessed area.

9. The disc drive data storage system of claim 5 and further comprising:

means for detecting the fly height of the slider; and means for controlling deformation of the deformable material as a function of the fly height detected by the means for detecting.

10. The disc drive data storage system of claim 9 wherein:

the transducer generates a signal during rotation of the disc, which comprises a characteristic that is a function of the fly height of the transducer; and the means for controlling controls deformation of the deformable material as a function of the characteristic.

11. The disc drive data storage system of claim 5 and further comprising:

means for receiving a position signal representing a radial position of the transducer on the disc; and means for controlling deformation of the deformable material as a function of the position signal.

12. A method for actively modifying a fly height of a transducer relative to a data storage disc, the method comprising:

(a) carrying the transducer with a slider, which comprises a front surface that faces the data storage disc, a back surface opposite to the front surface, and a crown curvature along the front surface;

(b) rotating the data storage disc relative to the slider; and (c) altering the crown curvature of the slider during the step of rotating by changing a dimension of a deformable material, which is attached to the slider, wherein a positive change in the crown curvature results in a positive change in the fly height and a negative change in the crown curvature results in a negative change in the fly height.

13. The method of claim 12 wherein, in step (c), the front surface comprises a length and first and second elongated rails, which extend along the length and form first and second bearing surfaces, respectively, wherein each bearing surface comprises a leading portion, a trailing portion and a waist portion, wherein the waist portion is wider than the leading and trailing portions and has a maximum width within a middle half of the length.

14. The method of claim 12 wherein the deformable material, is positioned on the back surface of the slider.

15. The method of claim 12 wherein step (c) comprises: changing a length of a layer of piezoelectric material, which is attached to the back surface of the slider, in a direction along the length of the slider such that the crown curvature changes from a first curvature value to a second curvature value.

16. The method of claim 12 wherein step (c) comprises:

(c)(1) compensating for thermal effects acting on the crown curvature of the slider.

17. The method of claim 12 and further comprising:

(d) detecting the fly height of the slider; and (e) altering the crown curvature in step (c) as a function of the fly height detected in step (d).

18. The method of claim 17 wherein:
  step (d) comprises generating a signal from the transducer during step (b), wherein the signal comprises a characteristic that is a function of the fly height of the transducer; and
  step (e) comprises altering the crown curvature in step (c) as a function of the characteristic.

19. The method of claim 18 wherein the characteristic is one of the group consisting of amplitude of pulses in the signal, width of pulses in the signal, a characteristic that represents presence of thermal asperities on the disc, and a characteristic that represents off-track position error of the Transducer relative to a desired radial position on the disc.

20. The method of claim 12 and further comprising:
  (d) receiving a position signal representing a radial position of the transducer on the disc; and
  (e) altering the crown curvature in step (c) as a function of the position signal received in step (d).

* * * * *